US005921451A

United States Patent [19]

Bolza-Schünemann

[11] Patent Number: 5,921,451

[45] Date of Patent: Jul. 13, 1999

[54] DRYER ASSEMBLY FOR SUPPORTING AND POSITIONING A WEB

[75] Inventor: Hans-Bernhard Bolza-Schünemann, Würzburg, Germany

[73] Assignee: Koenig & Bauer-Aktiengesellschaft, Wurzburg, Germany

[21] Appl. No.: 09/011,202

[22] PCT Filed: Jun. 12, 1997

[86] PCT No.: PCT/DE97/01192

§ 371 Date: Feb. 13, 1998

§ 102(e) Date: Feb. 13, 1998

[87] PCT Pub. No.: WO97/47934

PCT Pub. Date: Dec. 18, 1997

[30] Foreign Application Priority Data

| | | | |
|---|---|---|---|
| Jun. 14, 1996 | [DE] | Germany | 196 23 685 |
| Nov. 14, 1996 | [DE] | Germany | 196 47 050 |

[51] Int. Cl.[6] .......................... B23Q 15/00; B65H 20/00; F26B 3/08

[52] U.S. Cl. ................................ 226/18; 34/362; 34/369; 226/97.3; 242/615.11

[58] Field of Search .............................. 226/15, 18, 97.3; 242/615.11; 34/362, 369

[56] References Cited

U.S. PATENT DOCUMENTS

| | | | |
|---|---|---|---|
| 4,197,973 | 4/1980 | Daane . | |
| 4,292,745 | 10/1981 | Caratsch . | |
| 4,322,026 | 3/1982 | Young, Jr. | 226/15 |
| 4,480,777 | 11/1984 | Suzuki et al. . | |
| 4,833,794 | 5/1989 | Stibbe et al. . | |
| 5,152,080 | 10/1992 | Wimberger | 226/15 X |
| 5,272,819 | 12/1993 | Wimberger et al. . | |
| 5,353,979 | 10/1994 | Gartmann | 242/15 X |

FOREIGN PATENT DOCUMENTS

| | | |
|---|---|---|
| 0 068 272 | 1/1983 | European Pat. Off. . |
| 0 441 484 | 8/1991 | European Pat. Off. . |
| 0 513 990 | 11/1992 | European Pat. Off. . |
| 26 44 618 | 4/1978 | Germany . |
| 29 34 967 | 3/1980 | Germany . |
| 29 41 282 | 4/1980 | Germany . |
| 39 05 472 | 2/1990 | Germany . |
| 2 265 361 | 9/1993 | United Kingdom . |

*Primary Examiner*—Michael Mansen
*Attorney, Agent, or Firm*—Jones, Tullar & Cooper, P.C.

[57] ABSTRACT

The position of a printed web passing through an elongated dryer is shifted laterally during passage of the web through the dryer. A component of the resultant of all of the frictional forces acting on the web is caused to point in the lateral direction of the desired web shaft. This resultant of the frictional forces is obtainable by changing the spacing of blower nozzles, or by changing the pressure of discharged drying fluid across the width of the web.

15 Claims, 9 Drawing Sheets

19

18

DRYER ASSEMBLY FOR SUPPORTING AND POSITIONING A WEB

FIELD OF THE INVENTION

The present invention relates to a method for changing the position of a web in a suspension dryer and to a suspension dryer for accomplishing this web position change.

DESCRIPTION OF THE PRIOR ART

DE 39 05 472 A1 describes a dryer, wherein the slits of a diversion arrangement are adjustable in order to control the position of a web.

From DE 26 44 618 A1 a device for drying and for the suspended guidance of a web by means of blown jets is known. The web has a wave-shaped course of travel. These blown jets can be changed for increasing the wave formation in the web. A change of direction is intended to take place by means of this wave formation, so that the waves in the web are larger on that side of the web, in whose direction the web extends. However, tests have shown that the desired change of direction is not caused by changing the waves in the web.

DE 29 41 282 A1 describes a blower nozzle of a suspension dryer. An air flow with a component transversely to the conveying direction of a web is generated.

These transverse components of the air flow are not used for changing a position of a web, instead even drying of the web is intended to result.

SUMMARY OF THE INVENTION

It is the object of the present invention to provide a method for changing the position of a web, and to provide a suspension dryer.

In accordance with the present invention, this object is attained by utilizing a web dryer that is provided with a plurality of blowing jets that emerge from blower nozzles. A distance between the blower nozzles, and the web which is supported in the dryer by the blowing jets from the nozzles, can be changed. The distance from the nozzles to the web can be changed from one side of the web to the other. This will act to shift the path of travel of the web in the dryer. Alternatively, the pressure of the drying medium issuing from the nozzles can be changed on one side of the web in order to shift the path of travel of the web within the dryer.

It is not easy to bring the paper web, printed in several colors on both sides, freely suspended through the suspension dryer. Each contact with components of the suspension dryer smears the fresh print and causes waste.

Since the residence time of a web to be dried in the suspension dryer must be considered to be approximately one second, these dryers used to be 3 to 6 m long; today they are often 10 m long or, with a web speed of 15 m/s, even 15 m long. The freely suspended web is under considerable paper web tension in the suspension dryer for stabilization. In addition, the blower nozzle tubes for the gaseous drying medium above the paper web are customarily arranged offset by one-half division in respect to the blower nozzle tubes underneath the paper web. Because of this, the paper web moves through an elongated, approximately sine-shaped serpentine shape path with, for example, 40 wave crests spaced 250 mm apart over a 10 m length.

During operation, the paper web wave appears to stand still between the stationary blower tubes. In fact the paper elements pass the troughs and tips of the paper web generated by hot blown air in the dryer at speeds of 5 to 15 m/s.

With the web running, the required paper web tension is continuously maintained with great accuracy. To this end, cooling rollers arranged downstream of the suspension dryer convey slightly more paper by running at a higher speed than the last. printing unit located upstream of the suspension dryer delivers.

In the ideal case, the paper web runs through the entire length of the dryer exactly parallel with the longitudinal center axis of the dryer.

Unfortunately, because of their great length, previously known hot air suspension dryers have considerable problems, with so-called lateral web extension. This complicated behavior appears to different degrees result of numerous factors such as different web speeds, different paper weights, different selected web tension, differently selected hot air temperature depending on paper weight with natural or coated paper, different printing subjects with a lot or with little ink, symmetric or asymmetric subject distribution with webs of various web widths running centered or off-centered in respect to the longitudinal axis of the dryer, and the like.

By itself, the paper web, with a centered course in the suspension dryer, should also leave the dryer exactly centered. This is often not the case, i.e. the web does enter the dryer exactly centered after coming out of the last printing unit, but leaves the suspension dryer displaced transversely to the running direction of the web by 10 mm, 20 mm or even 50 mm in the direction toward the operating or drive side. Deviations of ±10 mm are permitted and are compensated by known “web aligners” after drying and cooling. Larger deviations lead to disruptions in the web run, and in the folding apparatus these devices lead to crease formations and misfolds, which mean waste.

If a 1 m wide web extends ±10 mm over a length of 10 m, this only means ± one mm per thousand in relation to the length of the dryer, but already ± one percent in relation to the web width. The requirements for accuracy make heat-set dryers very expensive.

The advantages which can be achieved by means of the present invention reside in particular in that the presently known untrue web running problems are solved. The web outflow from the dryer can be laterally corrected in relation to the web inflow by means of this suspension dryer. The dryer does not need to be cooled off for it to be possible to perform corrections, or respectively to make adaptations, to changed production requirements. The press operator should be able to return an occurring lateral untrue web running manually to “zero”, or the lateral untrue web running should be able to be measured and automatically corrected by means of a controlled system.

By charging a web with a force component in the direction of a lateral edge of the web, as generated by the air flow, a change in direction of the web is caused. A resultant of all of the forces acting on the web therefore has a component in the direction of a lateral edge of the web. A change in direction of the web in the direction of the lateral edge to which the component points is caused as a function of a value of this component.

The generation of such a force component in the direction of a lateral web edge is possible, for example, by generating an air flow in the direction of this lateral web edge. This air flow can be generated by a pressure drop in the dryer from a first to a second lateral edge. It is also possible to change the velocity, and/or the direction and/or the amount of a gaseous medium for example air acting on the web for drying. The velocity of the blowing jets of air or other drying medium acting on the web can be changed, for example, by means of changing the pressure or by means of a change of a distance between the nozzle openings and the web.

BRIEF DESCRIPTION OF THE DRAWINGS

The suspension dryer in accordance with the present invention is represented in the drawings and will be described in more detail in what follows.

Shown are in.

DESCRIPTION OF THE PREFERRED EMBODIMENTS

Figure 1:
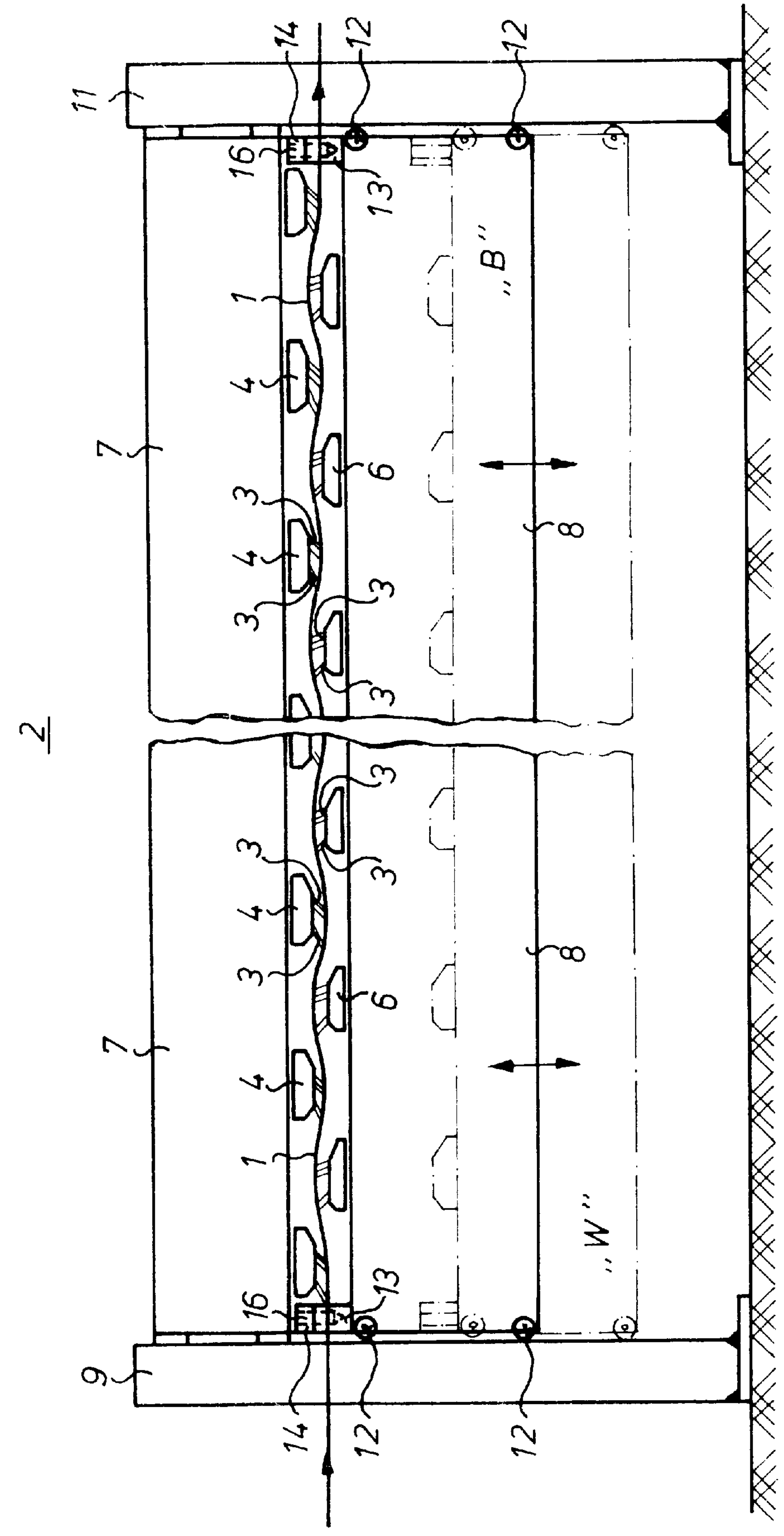
FIG. 1, a schematic side elevation view of a suspension dryer in accordance with the present invention.

In the side elevation or a lateral view of FIG. 1 there is shown a wave shape, known per se, of the running web 1, for example a paper web, in the suspension dryer 2, with this wave shape being generated by blower nozzle tubes 4, 6, equipped with blower nozzles 3. The blower nozzle tubes 4, 6, which are arranged above and below the web 1, are fastened on an upper chamber 7 and a lower chamber 8 respectively and these blower nozzle tubes 4, 6 are offset parallel in respect to each other and transversely in respect to the conveying direction "T" of the web 1. Because of this, the web 1 runs through the suspension dryer 2 in a wave or sinusoidal shape.

With one preferred embodiment of the suspension dryer 2, the upper chamber 7, with the blower nozzle tubes 4, is suspended firmly mounted between support columns 9, 11. The lower chamber 8, with the blower nozzle tubes 6 is movably guided by means of rollers 12 between the support columns 9, 11, and can be lowered parallel. from an operating position "B" into a maintenance position "W" as seen in FIG. 1. In the closed, operating position "B", detents 13 of the lower chamber 8 rest against fixed detents 14 and in centering pins 16.

Figure 2:
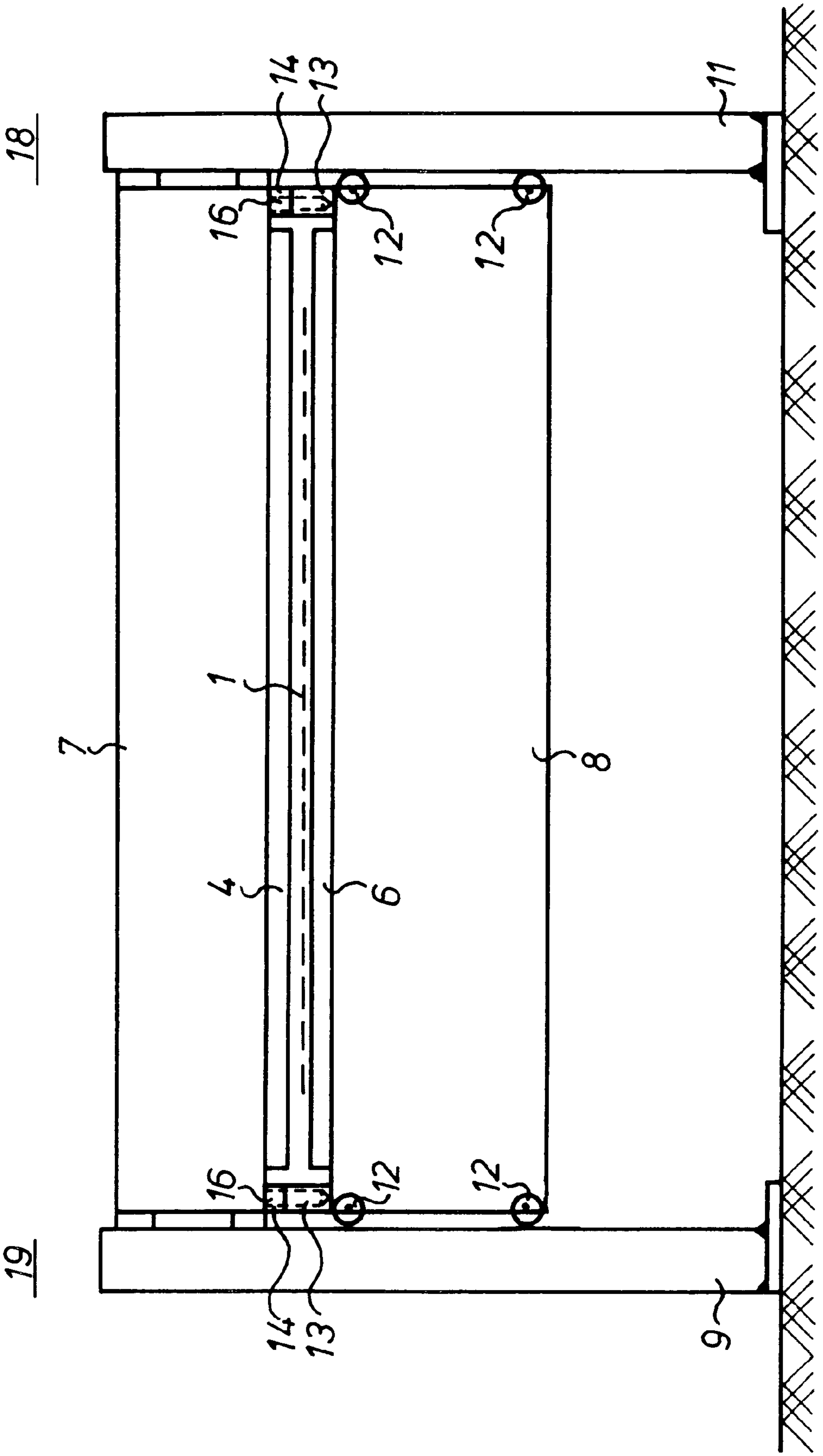
FIG. 2, a schematic plan view of a first preferred embodiment of an undeflected suspension dryer in the conveying direction "T" of a web.

FIG. 2 shows a plan view of the suspension dryer 2 in accordance with FIG. 1 in the undeflected position. Customarily, the upper and lower blower nozzle tubes 4, 6 are fixedly mounted on their associated chambers 7, 8 and lie parallel with each other. The web 1 lies parallel between them with parallel wave tips and troughs.

Figure 3:
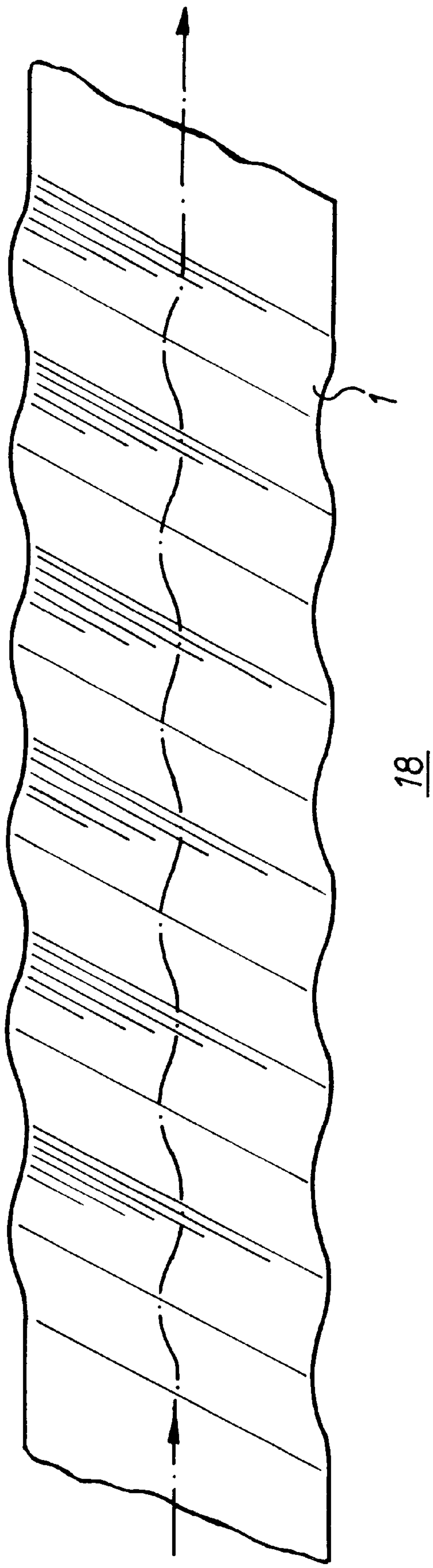
FIG. 3, a run of a web in the suspension dryer in accordance with FIG. 2.

FIG. 3 represents the run of the web 1 with wave tips and troughs of equal height and parallel with each other, which are formed by means of the parallel located blower nozzles 3 in accordance with FIG. 1 and FIG. 2.

Figure 4:
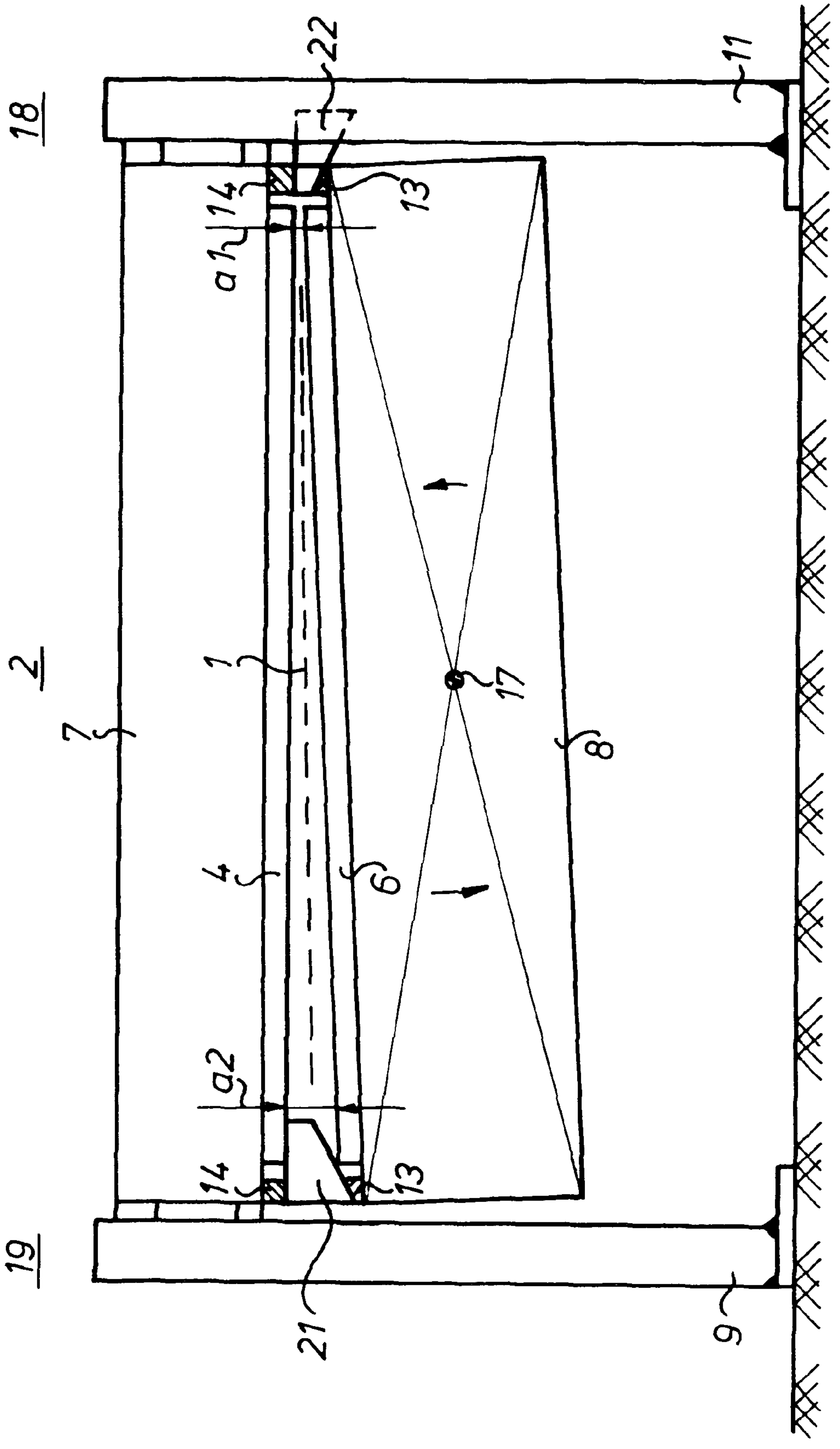
FIG. 4, a schematic plan view of the deflected suspension dryer in accordance with FIG. 2.
Figure 5:
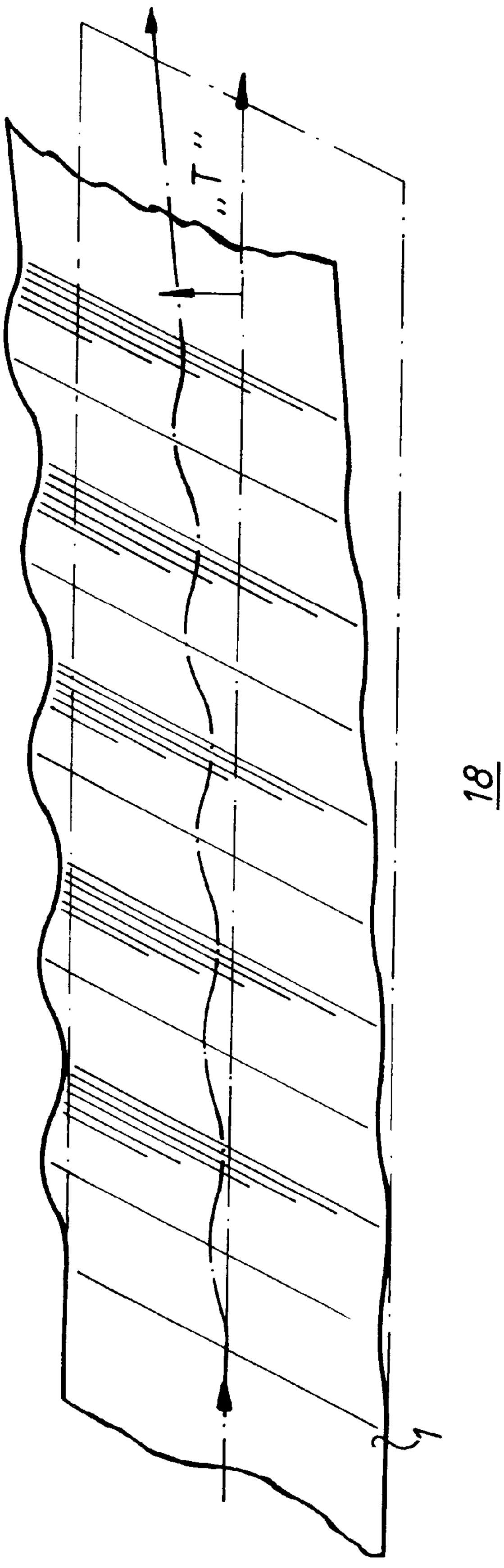
FIG. 5, a run of a web in the suspension dryer in accordance with FIG. 4.

In FIG. 4 a row of blower nozzles 3 in blower nozzle tube 6 is slightly pivoted perpendicularly in respect to the conveying direction T by rotation of the lower chamber 8 around its longitudinal axis 17 extending in the conveying direction "T". A distance a1 between the blower nozzles 3 at a first end of the blower nozzle tubes 4, 6 at an operating or first side 18 of the drive is therefore less over the entire length of the suspension blower 2 than a distance a2 between the blower nozzles 3 at a second end of the blower nozzle tubes 4, 6 on a dryer drive or second side 19. With equal pressure and an equal amount of a gaseous drying medium, for example air, an air flow is thus generated from the first or operating side 18 toward the second or drive side 19 of dryer 2. Because of this air flow, a force component acts in the direction toward the drive side 19. Therefore, as depicted in FIG. 5, the web 1 extends or shifts laterally with respect to its travel direction T in the direction toward the drive side 19 over the length of the suspension dryer 2. Adjustable wedges 21, 22 on the drive side 19 and on the operating side 18, which act together with the detents 13 of the lower chamber 8 and the detents 14 of the upper chamber 7, adjust the desired pivot position of the blower nozzle tubes 4, 6 continuously.

Figure 6:
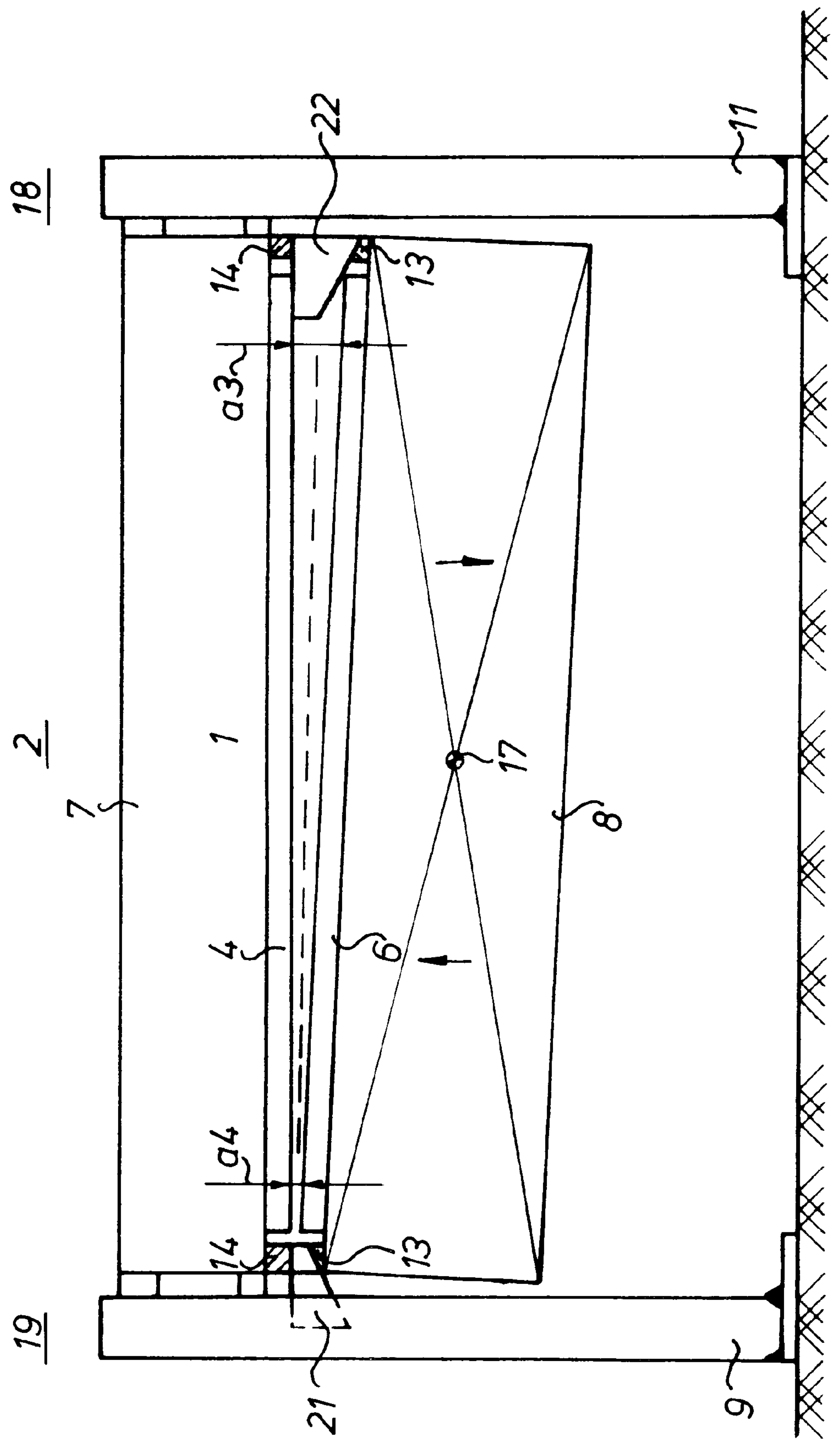
FIG. 6, a schematic plan view of the deflected suspension dryer in accordance with FIG. 2.
Figure 7:
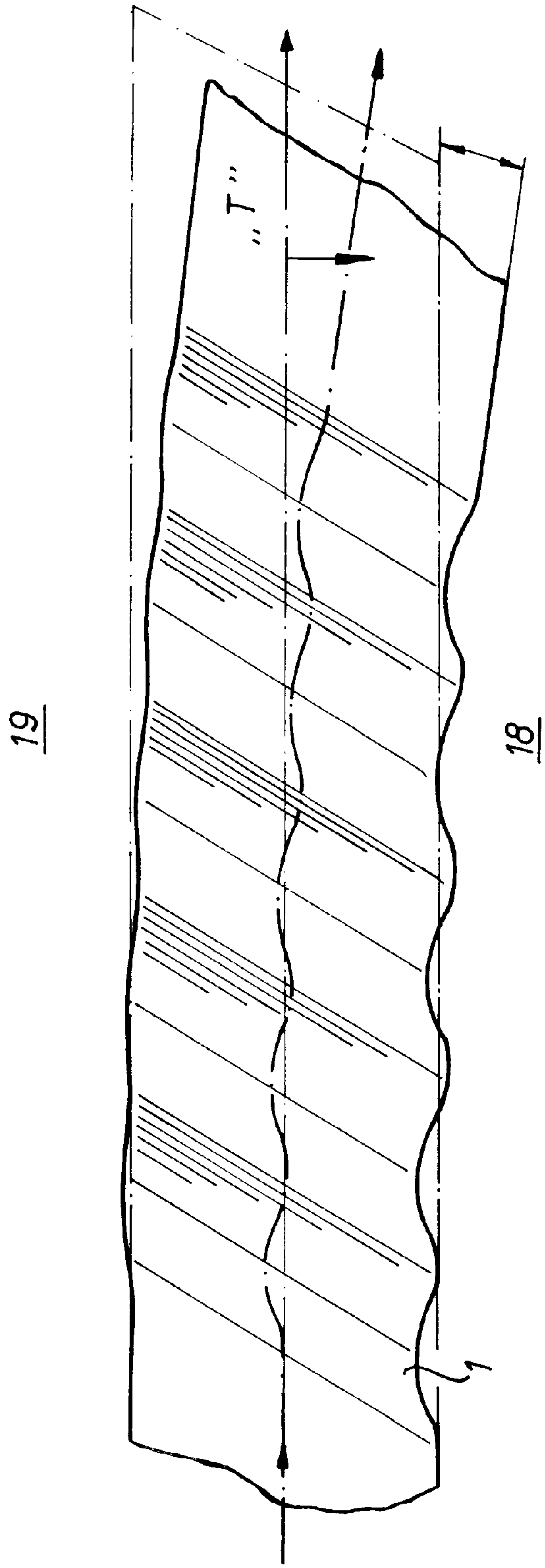
FIG. 7, a run of a web in the suspension dryer in accordance with FIG. 6.

FIG. 7 shows a lateral shifting running of the web 1 toward the first or operating side 18 of dryer 2 when a distance a3 of the blower nozzles 3 of the upper and lower chambers 4, 6 on the operating side 18 is greater than a distance a4 on the drive side 19 in accordance with FIG. 6. In this arrangement, the air flow is from the drive side 19 toward the operating side 18 of the dryer 2.

Figure 8:
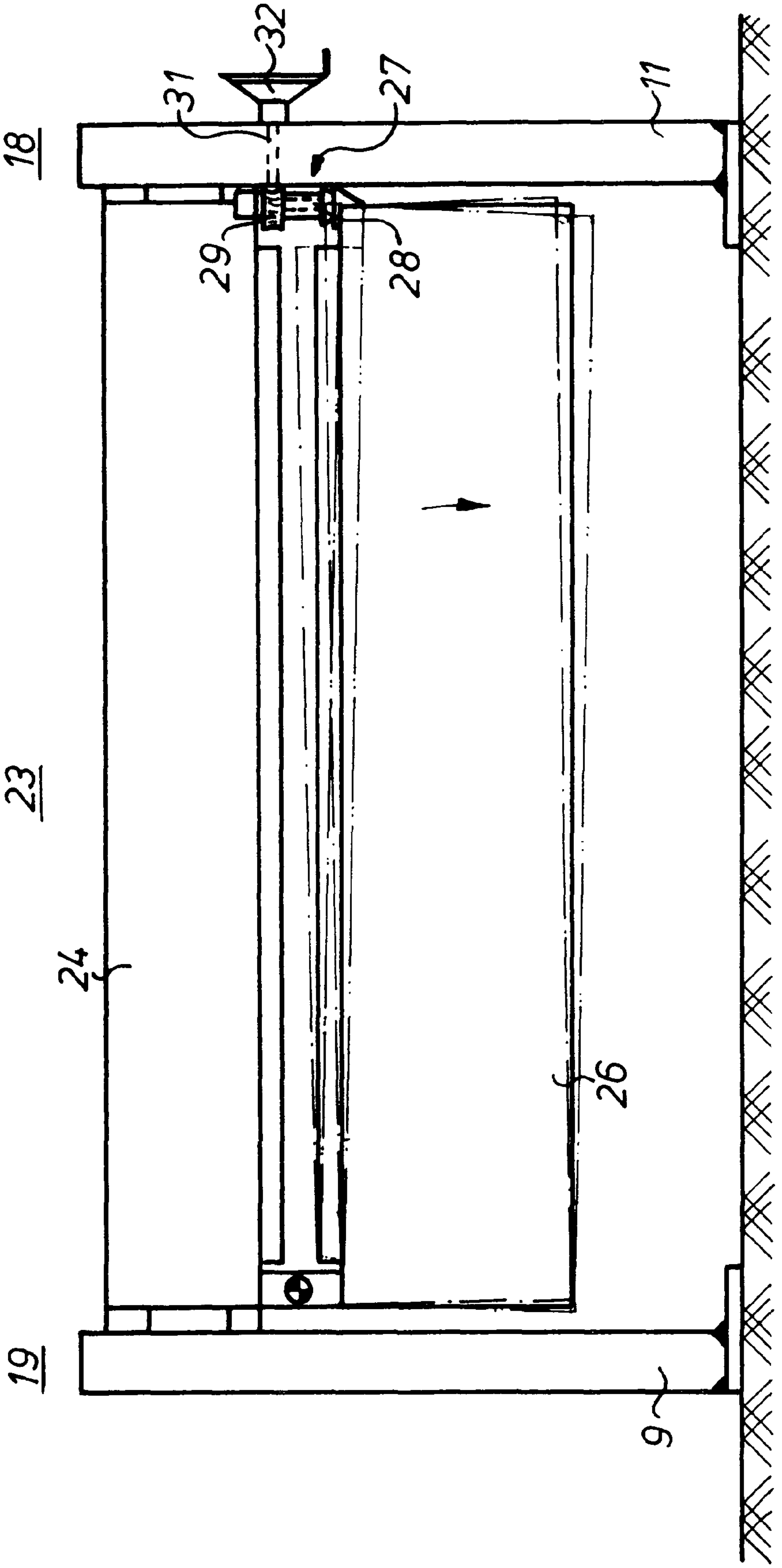
FIG. 8, a schematic plan view of a second preferred embodiment of a suspension dryer.

FIG. 8 shows, that pivoting of an upper chamber 7, a lower chamber 8 or of both chambers need not take place around the longitudinal axis 17 in a center of the suspension dryer 2 as shown in FIG. 4 and FIG. 6. It is also generally possible to perform the pivoting of one, or of both chambers around any arbitrary longitudinal axis of the suspension dryer 23 with the chambers 24, 26. A longitudinal edge, for example on the drive side 19, is particularly suited as the pivot axis, on which the movable chamber 26 rests during closing. In such a configuration one set of variable detents 27 at a distance of 2 m, for example, on the longitudinal edge on the operating side 18 then is sufficient for a continuous or stepped adjustment of the distance of the lower chamber 26 over the entire dryer length, for the purpose of the desired oblique positioning of all blower tubes 6 of the lower chamber 26 in relation to the upper chamber 24 for an optimal web run in the suspension dryer 23. The detents 27 can be threaded bolts 28, which can be adjusted individually from outside the dryer 23 by means of a handwheel 32, or centrally, or by motors by means of worm wheels 29 with worms 31.

Figure 9:
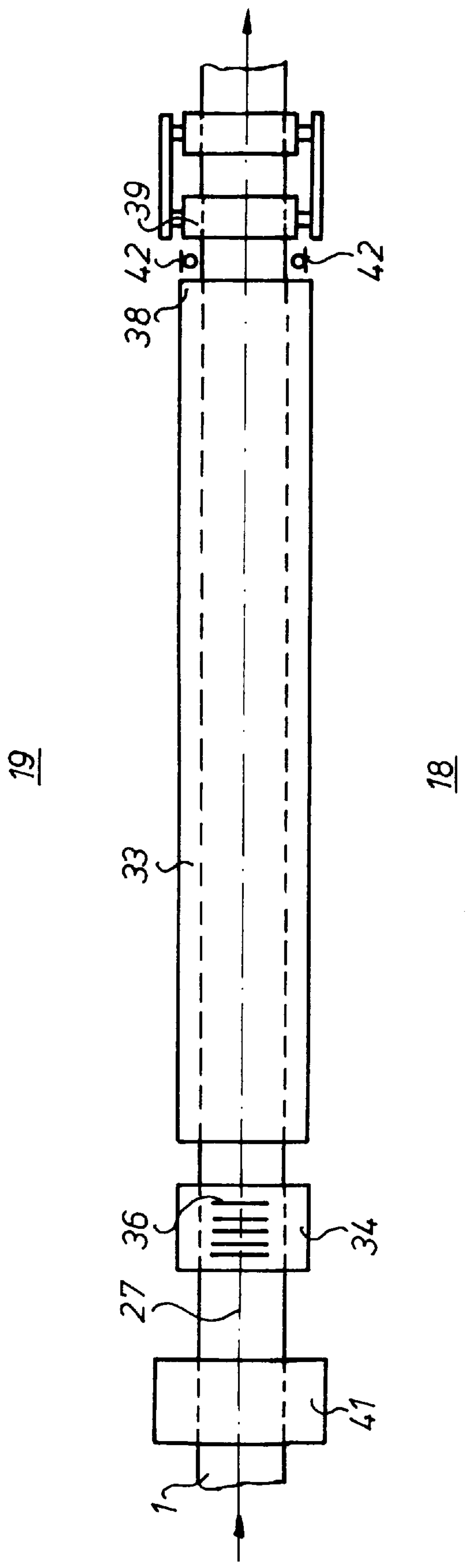
FIG. 9, a schematic top view of a run of the web in the area of the suspension dryer.

In a top view, FIG. 9 shows that it is furthermore possible to make use of a pointer effect. To this end, a dryer 33 of a length of 10 m, for example, is rigidly constructed in the usual manner. A short second dryer 34, for example 1 m long, has been placed in front of, i.e. at the inlet side of dryer 33. Only in this short preliminary dryer 34 can the blower nozzle tubes 36 in the lower blower nozzle box, for example, be pivoted around a longitudinal axis 37 transversely in relation to the conveying direction "T". If, for example, the undesired incorrect web running in the long dryer 33 is 30 mm, it is sufficient if the short dryer 34 is adjusted at a ratio of 1:10 to an opposite correction offset of 3 mm in order to arrive at an untrue web running of zero at the dryer outlet end 38 by means of a pointer effect over the further 10 m of rigid main dryer length. Thereafter, the web 1 enters the cooling roller group 39, while the last printing unit 41 is indicated at the far left.

It is also possible to modify the arrangement in accordance with FIG. 9, to omit the short adjusting dryer 34 and to install a pivotable auxiliary frame with additional blower tubes in place of some fixed blower tubes in the upper or lower blower box of the main dryer 33, wherein the auxiliary frame can be pivoted parallel with the paper web center in such a way that its blower tubes, which are located transversely in relation to the direction of the untrue web running, are standing either parallel with or more or less obliquely in relation to the fixed blower tubes.

In a further embodiment of the present invention, a closed control circuit for the automatic correction of possible untrue web running is introduced. For example, in accordance with FIG. 9 there are provided photoelectric cells 42 between the dryer outlet end 38 and the cooling rollers 39, which cells 42 monitor the lateral edges of the paper web on the operating side 18 and the drive side 19 of the dryer. If the web 1 runs out of the center position, a correction tilt of the movable blower box or blower frame is triggered via a computer or the like, and in this way the web 1 is automatically maintained in the center position.

The method in accordance with the present invention automatically corrects or compensates any untrue web running existing or being generated in the suspension dryer 23, or 33. Extensive adjustments in case of dryer deficiencies are avoided in an advantageous manner. The press operator or printer is freed of his monitoring job. It is possible to construct faster, i.e. even longer dryers, because possible untrue web running can be corrected by means of the arrangement in accordance with the invention.

A further embodiment of the present invention provides for a the change of the frictional forces acting on the web 1, for the purpose of correcting the untrue web running in the dryer, wherein all of the blower air tubes are not tiltable transversely to the longitudinal axis of the dryer, but are fixedly arranged in the lower and upper box, as previously known. However, all, or individual tubes, for example at the dryer inlet, are closed at the center of the dryer. The tubes on the operating side 18 and on the drive side 19 of the dryer are separately supplied with air. The separate air supply each for each side of each individual tube can be exactly adjusted as to the amounts of air and the air pressure. With this method, it is also possible to make the component of the frictional forces transversely in respect to the conveying direction "T", equal or of different size in the direction toward the drive 19 and the operating side 18 for a straight or slightly curved web run in the dryer. The blower tubes can also be divided into more than two chambers with separate air supply.

Here, too, a closed control circuit with photoelectric cells or the like can be used for the automatic determination of the web edge position. A computer sees to the direct amount of air and pressure on the operating and drive side of the dryer, so that the web continues to be regulated to be in the center at the dryer end or is laterally corrected to be where the press operator wants it to be for optimal entry into the folding apparatus.

It is common to all of the disclosed preferred embodiments, that the chance in direction of travel of the web 1 takes place by a change of the frictional forces acting on the web 1, so that a component of the resultant of all frictional forces acting on the web 1 points in the lateral direction of the desired lateral directional change of the web 1.

While preferred embodiments of a suspension dryer in accordance with the present invention have been set forth fully and completely hereinabove, it will be apparent to one of skill in the art that numerous changes in, for example, the type of web being dried, the source of the drying fluid, the structure of the press itself, and the like could be made without departing from the true spirit and scope of the present invention, which is accordingly to be limited only by the following claims.

What is claimed is:

1. A method for changing a lateral position of a web in a dryer assembly including:

providing a suspension dryer having a first length;

providing an adjusting dryer having a second length less than said first length;

moving said web in a conveying direction in said dryer assembly from a dryer assembly inlet to a dryer assembly outlet;

providing a plurality of adjusting dryer blower nozzles in said adjusting dryer;

providing a plurality of suspension dryer blower nozzles in said suspension dryer;

arranging said plurality of adjusting dryer and suspension dryer blower nozzles transversely to said conveying direction across a width of said web;

spacing said blower nozzles at a distance from said web;

causing blowing jets to emerge from said blower nozzles;

changing said distance between said adjusting dryer blower nozzles and said web across said width of said web; and making said distance greater on a side of said web in which said web lateral position is to be changed.

2. The method of claim 1 further including sensing an actual position of said web at said dryer outlet, determining a deviation of said actual position from a nominal position of said web, and using said deviation as a measure for accomplishing said changing of said distance between said adjusting dryer blower nozzles and said web.

3. A dryer assembly for use in supporting and positioning a moving web, said dryer assembly comprising:

a suspension dryer including a suspension dryer housing having a first length and having a dryer inlet and a dryer outlet;

a plurality of suspension dryer blower nozzles in said suspension dryer housing, said plurality of suspension dryer blower nozzles being arranged transverse to a conveying direction of a web moving through said suspension dryer housing;

an adjusting dryer located spaced, in said direction of web travel, from said suspension dryer, said adjusting dryer having a second length, said second length being less than said first length;

a plurality of adjusting dryer blower nozzles in said adjusting dryer; and means for changing a distance from said plurality of adjusting dryer blower nozzles to said web in said transverse direction to shift a web in said transverse direction in said adjusting dryer.

4. The dryer assembly of claim 3 wherein said blower nozzles are situated both above and below a web in said suspension dryer.

5. The dryer assembly of claim 4 wherein said blower nozzles above and below a web are equidistant from the web and a distance of said blower nozzles above and below a web are adjustable toward and away from the web.

6. The dryer assembly of claim 4 wherein a distance from each of said blower nozzles above a web and a distance from each of said blower nozzles below a web is adjustable toward and away from the web.

7. The dryer assembly of claim 3 wherein at least some of said blower nozzles are pivotable about a longitudinal axis of said adjusting dryer and which is disposed parallel to said conveying direction.

8. The dryer assembly of claim 3 further including at least one blower chamber in said suspension dryer, said blower chamber supporting said blower nozzles, and means for pivoting said at least one blower chamber about a longitudinal axis extending in said conveying direction.

9. The dryer assembly of claim 3 wherein only a portion of said plurality of blower nozzles are changeable in said distance to said web.

10. The dryer assembly of claim 3 further including placing said adjusting dryer before, in said direction of web travel, said suspension dryer housing.

11. The dryer assembly of claim 3 further including placing said adjusting dryer after, in said direction of web travel, said suspension dryer housing.

12. A dryer assembly for use in supporting and positioning a moving web, said dryer assembly comprising:

a suspension dryer housing having a first length;

a plurality of suspension dryer blower nozzles in said suspension dryer housing and arranged transversely to a conveying direction of a web moving through said suspension dryer housing;

an adjusting dryer located spaced in said direction of web travel, from said suspension dryer, said adjusting dryer having a second length, said second length being less than said first length;

a plurality of adjusting dryer blower nozzles in said adjusting dryer; and means for supplying a drying medium under pressure to said suspension dryer blower nozzles and to said adjusting dryer blower nozzles and for varying said pressure of said drying medium in said adjusting dryer blower nozzles.

13. The dryer assembly of claim 12 further including a plurality of chambers arranged generally perpendicularly to said conveying direction, said plurality of chambers supplying said drying medium to said blower nozzles.

14. The dryer assembly of claim 12 further including placing said adjusting dryer before, in said direction of web travel, said suspension dryer housing.

15. The dryer assembly of claim 12 further including placing said adjusting dryer after, in said direction of web travel, said suspension dryer housing.

* * * * *